July 15, 1969 J. SPITERI 3,456,154
LIGHT IMPEDANCE COUPLING NETWORK
Filed July 20, 1967
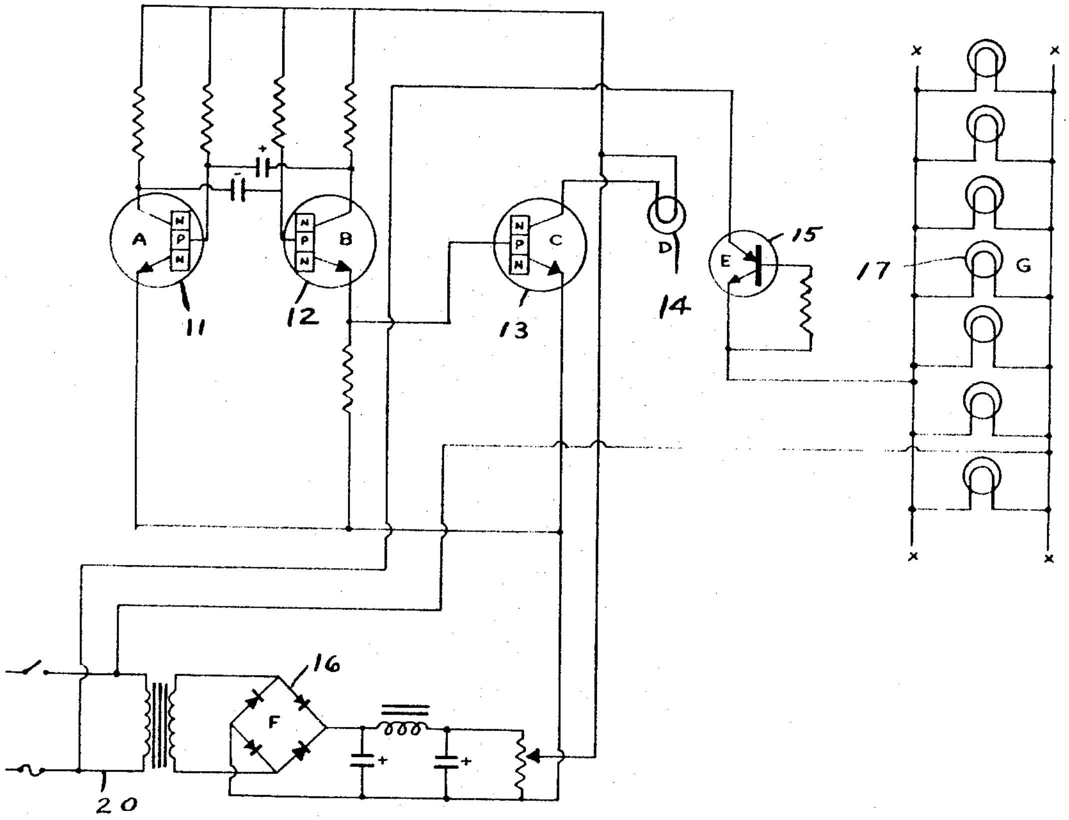
INVENTOR.
JOSEPH SPITERI
BY
Attorney

1

3,456,154
LIGHT IMPEDANCE COUPLING NETWORK
Joseph Spiteri, Erie, Pa., assignor to Truck-Lite Company Inc., Jamestown, N.Y., a corporation of New York
Filed July 20, 1967, Ser. No. 654,925
Int. Cl. H05 *41/36*
U.S. Cl. 315—149 4 Claims

ABSTRACT OF THE DISCLOSURE

In previous flasher circuits, the lights that were to be flashed were usually connected directly to the output of the circuit then when one of the lamps of the circuit burned out, the frequency of the driving circuit changed. Other circuits had moving parts, such as relays, which incurred all the disadvantages of relays, contacts, problems and the like.

This invention relates to electronic circuits and, more particularly, to flasher circuits.

In the circuit disclosed herein, a multi-vibrator driving circuit operates an emitter amplifier. The emitter amplifier is connected to a lamp which flashes a light beam which impinges on the surface of a light activated silicon controlled rectifier, called a LASCR. This LASCR, in turn, acts as a switch connected in series with a parallel circuit of lights to be flashed. These lights are turned on and off and are connected to a power circuit which may be any conventional power circuit available.

It is, accordingly, an object of the invention to provide an improved flasher circuit.

Another object of the invention is to provide a flasher circuit that has a perfect impedance balance between the lights being flashed and the circuit.

Another object of the invention is to provide a flasher circuit that will not change in frequency in proportion to the load attached.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

The figure is a view of the circuit according to the invention.

Now with more particular reference to the drawing, the circuit shown is made up of a multi-vibrator circuit, an amplifier circuit, a flasher lamp, a LASCR, a parallel circuit of tubes.

The multi-vibrator circuit is made up of the NPN transistors 11 and 12 which are used in a conventional multivibrator driving circuit shown which drives the NPN transistor 13. The NPN transistor 13 is used as a common emitter amplifier. The collector of transistor 13 has in series a conventional low voltage lamp that flashes a beam of light to the surface of the control element of the light activated silicon controlled rectifier 15. The rectifier 15, in turn, acts as a switch shown which is connected to

2 the lamps G which are all connected in parallel as shown. The lamps G are connected in parallel across the power circuit which is, in turn, connected to the power line 20.

The power line 20 supplies activating power for the electronic circuits from the DC supply which is connected from the full wave rectifier 16 which is filtered as shown and connected to the multi-vibrator and the LASCR circuit. Thus, the multi-vibrator circuit made up of transistors 11 and 12 flashes the lamp 14 which is connected through the transistor 13, thus, power is turned on and off through the LASCR 15 and the sixty cycle power current from line 20. The full wave rectifier circuit and the filter circuit as well as the circuit constants for including resistors and capacitors shown in the multi-vibrator circuit will be familiar to those skilled in the art and are believed to need no further elaboration.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A lamp flasher circuit comprising, first circuit means including a source of energy connected to a lamp and a light sensitive switch, second circuit means for intermittently actuating said first circuit means thereby flashing said lamp intermittently, said second circuit means including a light source and a switching means connected across a source of energy causing said light source to emit light, said light source being disposed to direct light onto said light sensitive switch, and multivibrator means intermittently actuating said second circuit means causing said lamp to flash intermittently.

2. The circuit recited in claim 1 wherein said second circuit comprises an amplifying switching means.

3. The circuit recited in claim 1 wherein said light sensitive valve comprises a light activated silicon controlled rectifier element.

4. The circuit recited in claim 3 wherein a first circuit is provided comprising a plurality of said lamps connected in parallel, and said lamps are each connected in series on the said light activated silicon controlled rectifier element.

References Cited

UNITED STATES PATENTS

| | | | |
|---|---|---|---|
| 2,973,456 | 2/1961 | Smyth | 315—159 |
| 3,188,623 | 6/1965 | Culbertson | 315—209 X |
| 3,297,910 | 1/1967 | Gershen | 250—206 X |
| 3,354,312 | 11/1967 | Howell | 307—311 |

JOHN W. HUCKERT, Primary Examiner
R. F. POLISSACH, Assistant Examiner

U.S. Cl. X.R.

250—206, 217; 307—247, 311; 315—150, 151, 152, 156, 157, 159, 209; 340—331